(12) United States Patent
Habermas et al.

(10) Patent No.: US 6,772,118 B2
(45) Date of Patent: Aug. 3, 2004

(54) AUTOMATED SPEECH RECOGNITION FILTER

(75) Inventors: Stephen C. Habermas, San Carlos, CA (US); Ognjen Todic, San Francisco, CA (US); Kai-Ten Feng, Fremont, CA (US); Jane F. MacFarlane, Oakland, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/045,683

(22) Filed: Jan. 4, 2002

(65) Prior Publication Data

US 2003/0130842 A1 Jul. 10, 2003

(51) Int. Cl.[7] .............................................. G10L 15/20
(52) U.S. Cl. ...................... 704/233; 704/255; 704/257; 704/227; 704/228
(58) Field of Search ................................ 704/233, 255, 704/256, 257, 201, 227, 228

(56) References Cited

U.S. PATENT DOCUMENTS

| | | | | |
|---|---|---|---|---|
| 4,720,802 A | * | 1/1988 | Damoulakis | 704/233 |
| 4,933,973 A | * | 6/1990 | Porter | 704/233 |
| 5,566,272 A | * | 10/1996 | Brems | 704/231 |
| 5,721,808 A | * | 2/1998 | Minami | 704/256 |
| 5,757,937 A | * | 5/1998 | Itoh | 381/94.3 |
| 5,970,446 A | * | 10/1999 | Goldberg | 704/233 |
| 6,169,971 B1 | * | 1/2001 | Bhattacharya | 704/225 |

OTHER PUBLICATIONS

US Publication No.: US 2002/0059068, Rose et, al, Application No. 09/966,259. Filed: Oct. 1, 2001.*

* cited by examiner

Primary Examiner—Richemond Dorvil
Assistant Examiner—Kinari Patel
(74) Attorney, Agent, or Firm—Anthony Luke Simon (57) ABSTRACT

An automated speech recognition filter is disclosed. The automated speech recognition filter device provides a speech signal to an automated speech platform that approximates an original speech signal as spoken into a transceiver by a user. In providing the speech signal, the automated speech recognition filter determines various models representative of a cumulative signal degradation of the original speech signal from various devices along a transmission signal path and a reception signal path between the transceiver and a device housing the filter. The automated speech platform can thereby provide an audio signal corresponding to a context of the original speech signal.

22 Claims, 4 Drawing Sheets

AUTOMATED SPEECH RECOGNITION FILTER

BACKGROUND OF THE INVENTION

1. Field of the Invention

The present invention generally relates to automated speech recognition ("ASR") methods and systems. The present invention particularly relates to ASR methods and devices for providing an input speech signal to an ASR platform that approximates an original speech signal.

2. Description of the Related Art

An ASR platform as known in the art is designed to respond to a reception of a transmitted speech signal (e.g., voice commands) from a transceiver (e.g., mobile phones, embedded car phones, and phone enabled personal data assistants) with an audio signal that corresponds to the context of the transmitted speech signal. However, the performance of prior art ASR platform is adversely affected by any signal degradation of the transmitted speech signal (e.g., acoustical coupling and signal distortion) along a transmission signal path from a user of the transceiver to the ASR platform. Prior art attempts to minimize, if not eliminate, any signal degradation of the transmitted speech signal have generally proven to be unacceptable. The present invention addresses this problem.

SUMMARY OF THE INVENTION

The present invention relates to an automated speech recognition filter that overcomes the aforementioned disadvantages of the prior art. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

One form of the present invention is an automated speech recognition filter including means for determining one or more models representative of a signal degradation of a first speech signal transmitted from a transceiver to the automated speech recognition filter, and means for providing a second speech signal as a function of the model(s) whereby the second speech signal is an approximation of the first speech signal.

A second form of the invention is an automated speech recognition filtering device comprising means for determining one or more models representative of a signal degradation of a first speech signal transmitted from a transceiver to said automated speech recognition filtering device, and means for providing a second speech signal as a function of the model(s) whereby the second speech signal is an approximation of the first speech signal. The automated speech recognition filtering device further comprises a database operable to store a user profile corresponding to the first set of one or more models.

A third form of the invention is an automated speech recognition system comprising means for determining one or more models representative of a signal degradation of a first speech signal transmitted from a transceiver to the automated speech recognition system, and means for providing a second speech signal as a function of the model(s) whereby the second speech signal is an approximation of the first speech signal. The automated speech recognition system further comprises an automated speech recognition platform operable to provide an audio signal in response to a reception of the second speech signal with the audio signal corresponding to a context of the first speech signal.

The foregoing forms, and other forms, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
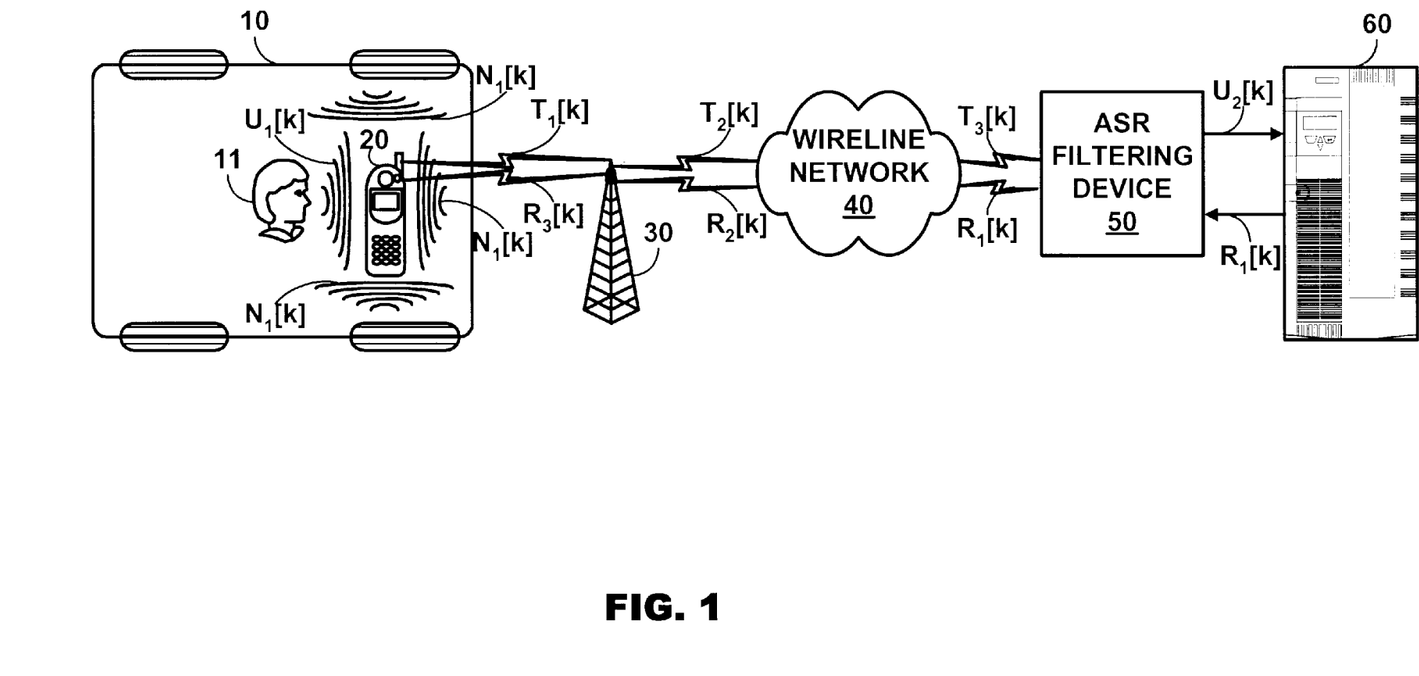
FIG. 1 is an illustration of a hands-free, in-vehicle environment in accordance with the present invention.

FIG. 1 illustrates a hands-free, in-vehicle environment containing a conventional vehicle 10, a conventional wireless network 30, a conventional wireline network 40, an ASR filtering device 50 of the present invention, and a conventional ASR platform 60. A user 11 of a transceiver in the form of a mobile phone 20 is seated within vehicle 10. In other embodiments of the present invention, the transceiver can be in the form of an embedded car phone, a phone enabled personal data assistant, and any other transceiver for transmitting and receiving a phone call.

A more detailed explanation of the invention will now be provided herein. Those having ordinary skill in the art will appreciate that the various described signals are based upon a discrete time instant k and the various described filters and models are based upon a discrete time, frequency domain operator z. Specifically, the operator z is used to represent the frequency response characteristics of the filters and the models described herein. Additionally, those having ordinary skill in the art will appreciate that an audio signal of the present invention can include one or more forms of sound.

Mobile phone 20 conventionally transmits a transmission signal $T_1[k]$ to wireless network 30 in response to user 11 articulating a speech signal $U_1[k]$ in a direction of a microphone (not shown) of mobile phone 20. Speech signal $U_1[k]$ is a main component of transmission signal $T_1[k]$. A noise signal $N_1[k]$ consisting of noise emanating from various sources of vehicle 10 (e.g., an engine, a heater/air conditioner, a radio, and a pair of wiper blades) are also components of transmission signal $T_1[k]$. In addition, an audio signal $R_5[k]$ (FIG. 2) being an acoustically coupled form of an audio signal $R_4[k]$ is a component of transmission signal $T_1[k]$. Transmission signal $T_1[k]$ therefore ranges from a slightly distorted version of speech signal $U_1[k]$ to a significantly distorted version of speech signal $U_1[k]$ as a function of an intensity of the vehicle noise signal $N_1[k]$ and an intensity of audio signal $R_5[k]$ generated by mobile phone 20, wireless network 30, and wireline network 40.

Wireless network 30 (e.g., an advanced mobile phone service, a time division multiple access network, a code division multiple access network, and a global system for mobile communications) conventionally transmits a transmission signal $T_2[k]$ to wireline network 40 in response to a reception of transmission signal $T_1[k]$ by wireless network 30. The conventional transmission of transmission signal $T_2[k]$ involves a degree of signal distortion and a degree of signal attenuation of transmission signal $T_1[k]$ by wireless network 30. Transmission signal $T_2[k]$ therefore ranges from a slightly distorted version of transmission signal $T_1[k]$ to a significantly distorted version of transmission signal $T_1[k]$ as a function of an intensity of the signal distortion and an intensity of the signal attenuation by wireless network 30 upon transmission signal $T_1[k]$.

Wireline network 40 (e.g., a Public Switched Telephone Network, and VOIP network) conventionally transmits a transmission signal $T_3[k]$ to ASR filtering device 50 in response to a reception of transmission signal $T_2[k]$ by wireline network 40. The conventional transmission of transmission signal $T_3[k]$ involves a degree of signal distortion and a degree of signal attenuation of transmission signal $T_2[k]$ by wireline network 40. Transmission signal $T_3[k]$ therefore ranges from a slightly distorted version of transmission signal $T_2[k]$ to a significantly distorted version of transmission signal $T_2[k]$ as a function of an intensity of the signal distortion and an intensity of the signal attenuation by wireline network 40 upon transmission signal $T_2[k]$.

ASR filtering device 50 uniquely transmits a speech signal $U_2[k]$ to ASR platform 60 (e.g., a computer platform employing commercially available speech recognition software from Nuance of Menlo Park, Calif. or SpeechWorks of Boston, Mass.) in response to a reception of transmission signal $T_3[k]$ by ASR filtering device 50. The unique transmission of speech signal $U_2[k]$ by ASR filtering device 50 involves a utilization of profile based characteristics of vehicle 10, mobile phone 20, wireless network 30, and wireline network 40 as well as a utilization of real-time signal characteristics of transmission signal $T_3[k]$, audio signal $R_1[k]$, and an estimate of vehicle noise signal $N[k]$. The result, as will be further described herein in connection with FIGS. 3 and 4, ASR filtering device 50 transmits speech signal $U_2[k]$ to ASR platform 60 as an approximation of speech signal $U_1[k]$. An improved performance of ASR platform 60 is therefore facilitated by a reception of speech signal $U_2[k]$ by ASR platform 60.

Figure 2:
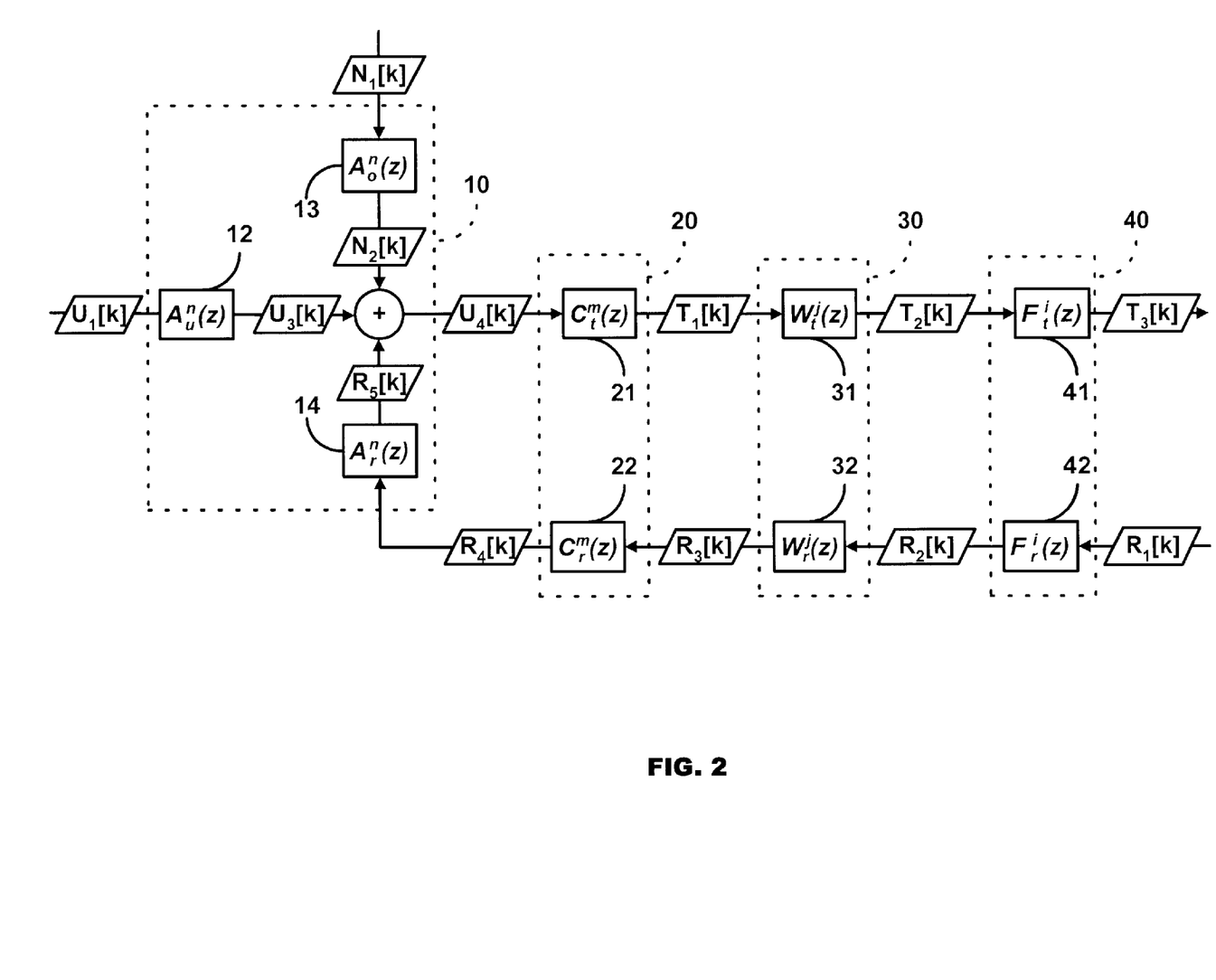
FIG. 2 is an illustration of a transmission signal path and a reception signal path between a vehicle and a wireline network as known in the art.

FIG. 2 illustrates a transmission signal path from vehicle 10 to wireline network 40 and a reception signal path from wireline network 40 to vehicle 10. In vehicle 10, a speech signal $U_3[k]$, a vehicle noise signal $N_2[k]$, and audio signal $R_5[k]$ serve as inputs of a summation process for generating a speech signal $U_4[k]$ that is a degraded version of speech signal $U_1[k]$. A processing function in the form of an acoustic model 12 represents an acoustical effect on speech signal $U_1[k]$ that produces speech signal $U_3[k]$ as a result of a distance between user 11 (FIG. 1) and a microphone (not shown) of mobile phone 20. A processing function in the form of an acoustic model 13 represents an acoustical effect on vehicle noise signal $N_1[k]$ by vehicle 10 that produces vehicle noise signal $N_2[k]$. A processing function in the form of an acoustic model 14 represents an acoustical effect on audio signal $R_4[k]$ that produces audio signal $R_5[k]$ resulting from an acoustical coupling between the microphone and a speaker (not shown) of mobile phone 20. Variable n within acoustic models 12–14 corresponds to a particular type of vehicle 10 (FIG. 1).

The transmission signal path includes processing functions in the form of a transmission model 21 of mobile phone 20, a transmission model 31 of wireless network 30, and a transmission model 41 of wireline network 40. The reception signal path includes processing functions in the form of a reception model 22 of mobile phone 20, a reception model 32 of wireless network 30, and a reception model 42 of wireline network 40.

Transmission model 21 represents a signal degradation of speech signal $U_1[k]$ by mobile phone 20 in a generation of transmission signal $T_1[k]$ by mobile phone 20 in response to a reception of speech signal $U_4[k]$ during a transmission mode of operation of mobile phone 20. Reception model 22 represents a signal degradation of audio signal $R_1[k]$ by mobile phone 20 in a generation audio signal $R_4[k]$ by mobile phone 20 in response to a reception of audio signal $R_3[k]$ during a reception mode of operation of mobile phone 20. Variable m within transmission model 21 and reception model 22 corresponds to a particular type of mobile phone 20.

Transmission model 31 represents a signal degradation of speech signal $U_1[k]$ by wireless network 30 in a generation of transmission signal $T_2[k]$ by wireless network 30 in response to a reception of transmission signal $T_1[k]$ during a transmission mode of operation of wireless network 30. Reception model 32 represents a signal degradation of audio signal $R_1[k]$ by wireless network 30 in a generation of audio signal $R_3[k]$ by wireless network 30 in response to a reception of audio signal $R_2[k]$ during a reception mode of operation of wireless network 30. Variable j within transmission model 31 and reception model 32 corresponds to a particular type of wireless network 30.

Transmission model 41 represents a signal degradation of speech signal $U_1[k]$ by wireline network 40 in a generation of transmission signal $T_3[k]$ by wireline network 40 in response to a reception of transmission signal $T_2[k]$ during a transmission mode of operation of wireline network 40. Reception model 42 represents a signal degradation of audio signal $R_1[k]$ by wireline network 40 in a generation of audio signal $R_2[k]$ by wireline network 40 in response to a reception of audio signal $R_1[k]$ during a reception mode of operation of wireline network 40. Variable; within transmission model 41 and reception model 42 corresponds to a particular type of wireline network 40.

Figure 3:
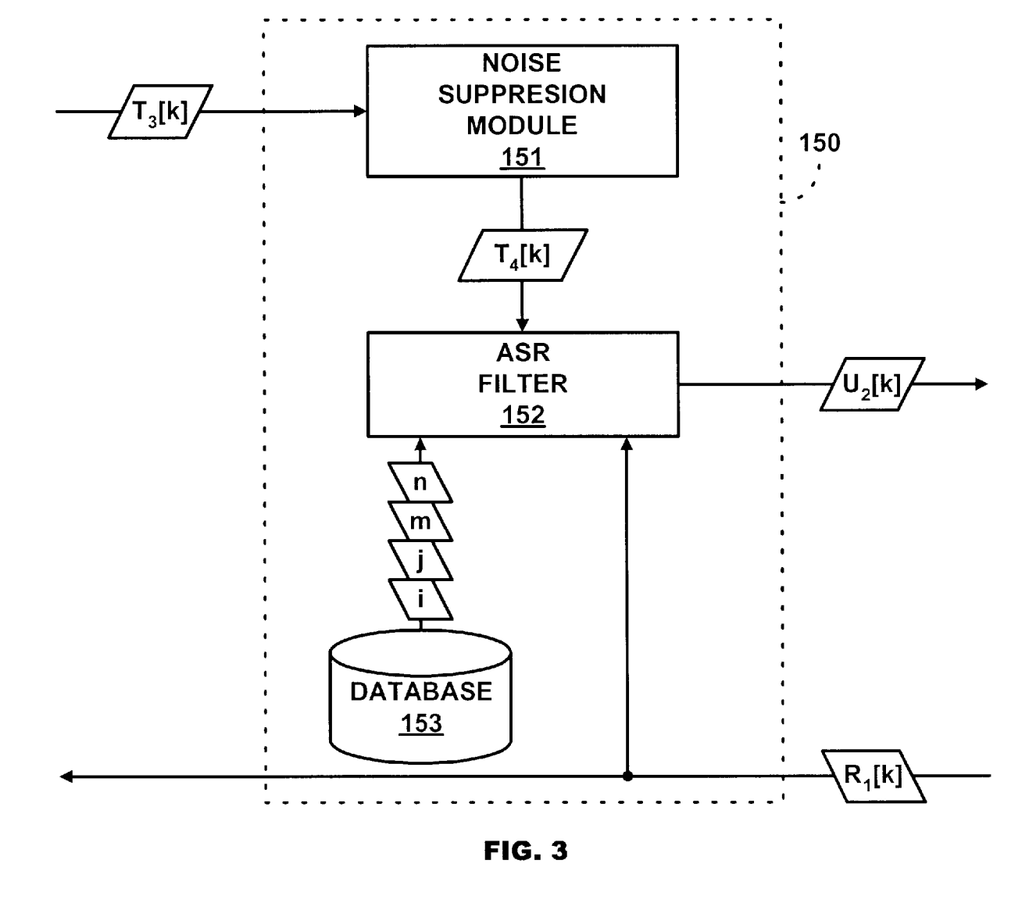
FIG. 3 is a block diagram of a first embodiment of an automated speech recognition filtering device in accordance with the present invention.

FIG. 3 illustrates ASR filtering device 150 as one embodiment of ASR filtering device 50 (FIG. 1). ASR filtering device 150 includes a noise suppression module 151 and an ASR filter 152 which both may be comprised of digital circuitry, analog circuitry, or both (e.g., an application specific integration circuit). Also, noise suppression module 151 and ASR filter 152 may be programmable, dedicated state machines, or a hybrid combination of programmable and dedicated hardware. To implement the principals of the present invention, ASR filtering device 150 can further include any control clocks, interfaces, signal conditioners, filters, Analog-to-Digital (A/D) converters, Digital-to-Analog (D/A) converters, communication ports, or other types of operators as would occur to those having ordinary skill in the art.

In one embodiment, ASR filtering device 150 includes one or more commercially available microprocessors (not shown) operatively coupled to one or more commercially available solid-state memory devices (not shown) containing programming corresponding to noise discrimination module 151 and ASR filter 152 as software modules. In the illustrated embodiment, ASR filtering device 150 further includes a database 153 containing user profiles including known and/or unknown values of variables n, m, j and i illustrated in FIG. 2. The following TABLE 1 is an exemplary listing of user profiles within database 153:

TABLE 1

| USER PROFILE | VARIALBE n | VARIABLE m | VARIABLE j | VARIABLE i |
|---|---|---|---|---|
| 1 | 1 (Car X) | 1 (Phone X) | 1 (AMPS) | 1 (PSTN) |
| 2 | 1 (Car X) | 2 (PDA X) | 2 (TDMA) | 1 (PSTN) |
| 3 | 2 (Car Y) | 3 (ECP X) | 3 (CDMA) | 2 (VoIP) |
| 4 | 2 (Car Y) | 1 (Phone X) | Unknown | Unknown |

TABLE 1-continued

| USER PROFILE | VARIALBE n | VARIABLE m | VARIABLE j | VARIABLE i |
|---|---|---|---|---|
| 5 | 3 (Car Z) | 2 (PDA X) | Unknown | Unknown |
| 6 | 3 (Car Z) | 3 (ECP X) | Unknown | Unknown |

In TABLE 1, PDA is an abbreviation for phone enabled personal data assistant and ECP is an abbreviation for an embedded car phone.

The operation of ASR filter device 150 will now be described herein. First, noise suppression module 151 conventionally provides a transmission signal $T_4[k]$ to ASR filter 152 in response to a reception of transmission signal $T_3[k]$ from wireline network 40 (FIG. 1) by ASR filtering device 150. In one embodiment, noise suppression module 151 conventionally attenuates vehicle noise $N_2[k]$ from transmission signal $T_3[k]$ in generating transmission signal $T_4[k]$.

Second, ASR filter 152 receives transmission signal $T_4[k]$ and audio signal $R_1[k]$ to provide a speech signal $U_2[k]$ as an approximation of speech signal $U_1[k]$. In one embodiment, ASR filter 152 identifies a user profile in response to an identification signal (not shown) to ASR platform 60 via ASR filtering device 150 prior to the reception of transmission signal $T_3[k]$ by ASR filtering device 150, and thereafter reads the values of variables n, m, j and i from the identified user profile as stored in database 153. The identification signal can include a data component or a characteristic indicating a frequency response characteristic of mobile phone 20 or wireless network 30 as would occur to those having ordinary skill in the art.

In response to variables n, m, j and i, ASR filter 152 establishes a filter $J_{t1}(z,i,j,m,n)[k]$ in accordance with the following equations [1]–[3]:

$$P_{t1} = C_t^m * W_t^j * F_t^i \quad [1]$$

$$P_{r1} = A_r^n * C_r^m * W_r^j * F_r^i \quad [2]$$

$$J_{t1}(z, i, j, m, n)[k] = \frac{T_4[k] - (P_{t1} * P_{r1} * R_1[k])}{P_{t1} * A_u^n * T_4[k]} \quad [3]$$

ASR filter 152 filters transmission signal $T_4[k]$ and audio signal $R_1[k]$ through filter $J_{t1}(z,i,j,m,n)[k]$ to provide speech signal $U_2[k]$ as an approximation of speech signal $U_1[k]$.

In embodiments of the present invention wherein wireless network 30 is omitted, ASR filter 152 establishes a filter $J_{t2}(z,i,m,n)[k]$ in accordance with the following equations [4]–[6]:

$$P_{t2} = C_t^m * F_t^i \quad [4]$$

$$P_{r2} = A_r^n * C_r^m * F_r^i \quad [5]$$

$$J_{t2}(z, i, m, n)[k] = \frac{T_4[k] - (P_{t2} * P_{r2} * R_1[k])}{P_{t2} * A_u^n * T_4[k]} \quad [6]$$

whereby ASR filter 152 filters transmission signal $T_4[k]$ and audio signal $R_1[k]$ through filter $J_{t2}(z,i,m,n)[k]$ to provide speech signal $U_2[k]$ as an approximation of speech signal $U_1[k]$.

In embodiments of the present invention wherein wireline network 40 is omitted, ASR filter 152 establishes a filter $J_{t3}(z,j,m,n)[k]$ in accordance with the following equations [7]–[9]:

$$P_{t3} = C_t^m * W_t^j \quad [7]$$

$$P_{r3} = A_r^n * C_r^m * W_r^j \quad [8]$$

$$J_{t3}(z, j, m, n)[k] = \frac{T_4[k] - (P_{t3} * P_{r3} * R_1[k])}{P_{t3} * A_u^n * T_4[k]} \quad [9]$$

whereby ASR filter 152 filters transmission signal $T_4[k]$ and audio signal $R_1[k]$ through filter $J_{t3}(z,j,m,n)[k]$ to provide speech signal $U_2[k]$ as an approximation of speech signal $U_1[k]$.

In embodiments of the present invention wherein wireless network 30 and wireline network 40 is omitted, ASR filter 152 establishes a filter $J_{t4}(z,m,n)[k]$ in accordance with the following equations [10]–[12]:

$$P_{t4} = C_t^m \quad [10]$$

$$P_{r4} = A_r^n * C_r^m \quad [11]$$

$$J_{t4}(z, m, n)[k] = \frac{T_4[k] - (P_{t4} * P_{r4} * R_1[k])}{P_{t4} * A_u^n * T_4[k]} \quad [12]$$

whereby ASR filter 152 filters transmission signal $T_4[k]$ and audio signal $R_1[k]$ through filter $J_{t4}(z,m,n)[k]$ to provide speech signal $U_2[k]$ as an approximation of speech signal $U_1[k]$.

Figure 4:
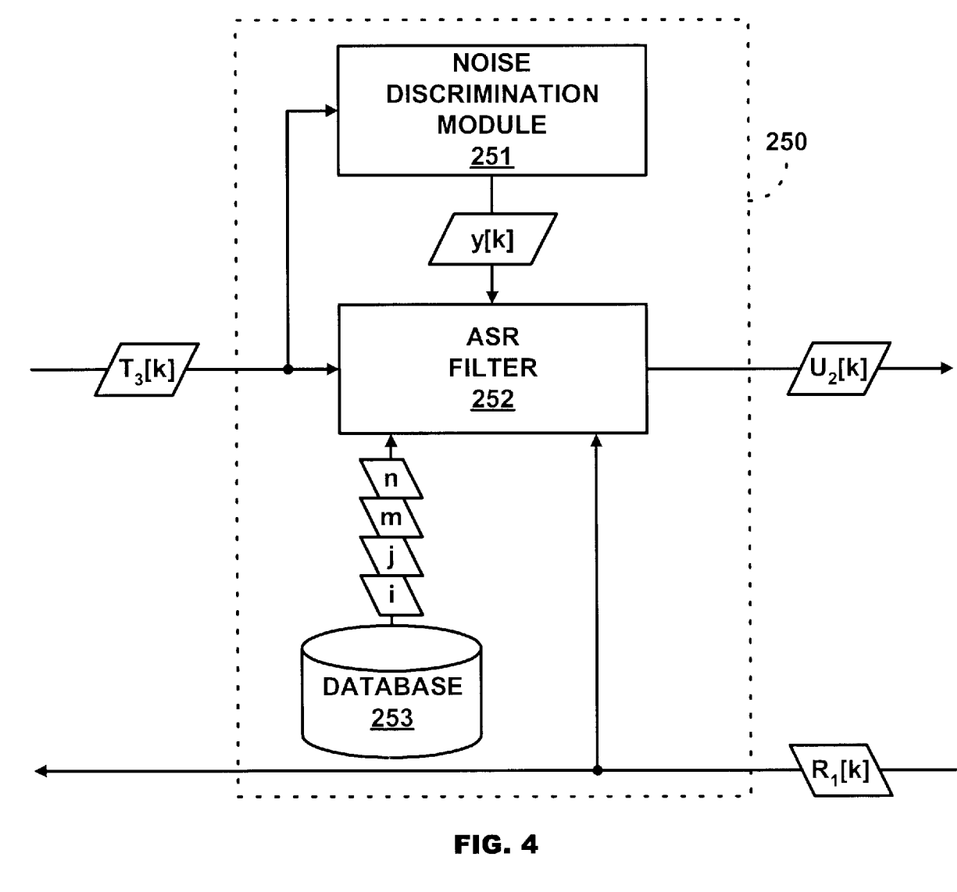
FIG. 4 is a block diagram of a second embodiment of an automated speech recognition filtering device in accordance with the present invention.

FIG. 4 illustrates ASR filtering device 250 as one embodiment of ASR filtering device 50 (FIG. 1). ASR filtering device 250 includes a noise discrimination module 251 and an ASR filter 252 which both may be comprised of digital circuitry, analog circuitry, or both (e.g., an application specific integration circuit). Also, noise discrimination module 251 and ASR filter 252 may be programmable, dedicated state machines, or a hybrid combination of programmable and dedicated hardware. To implement the principals of the present invention, ASR filtering device 250 can further include any control clocks, interfaces, signal conditioners, filters, Analog-to-Digital (A/D) converters, Digital-to-Analog (D/A) converters, communication ports, or other types of operators as would occur to those having ordinary skill in the art.

In one embodiment, ASR filtering device 250 includes one or more commercially available microprocessors (not shown) operatively coupled to one or more commercially available solid-state memory devices (not shown) containing programming corresponding to noise discrimination module 251 and ASR filter 252. In the illustrated embodiment, ASR filtering device 250 further includes a database 253 containing user profiles including known and/or unknown values of variables n, m, j and i similarly to the description of database 153 (FIG. 3).

The operation of ASR filter device 250 will now be described herein. First, noise discrimination module 251 provides a noise discrimination signal y[k] to ASR filter 252 in response to a reception of transmission signal $T_3[k]$ from wireline network 40 (FIG. 1) by ASR filtering device 250. In one embodiment, noise discrimination module 251 inputs transmission signal $T_3[k]$ to compute noise discrimination signal y[k] in accordance with the following equations [1] and [13]:

$$P_{t1} = C_t^m * W_t^j * F_t^i \quad [1]$$

$$y[k] = P_{t1} * A_o^n * N_1[k_n] \quad [13]$$

where $k_n$ is a time sample during which speech signal $U_1[k]$ (FIG. 2) is not present within transmission signal T₃[k] and vehicle noise signal N₁[k] (FIG. 2) is within transmission signal T₃[k]. Noise discrimination module 251 determines an absence of speech signal U₁[k] and a presence of vehicle noise signal N₁[k] within transmission signal T₃[k] by distinguishing a significant difference in different energy level ranges and spectral characteristics of transmission signal T₃[k]. Noise discrimination module 251 assumes a steady state noise characteristics of vehicle noise signal N₁[k] to thereby generate noise discrimination signal y[k] in accordance with the following equation [14]:

$$y[k] \cong P_{t1} * A_o^n * N_1[k] \quad [14]$$

Second, ASR filter 252 receives transmission signal T₃[k], noise discrimination signal y[k], and audio signal R₁[k] to provide speech signal U₂[k] as an approximation of speech signal U₁[k]. In one embodiment, ASR filter 252 identifies a user profile in response to an identification signal (not shown) transmitted to ASR platform 60 via ASR filtering device 250 prior to the reception of transmission signal T₃[k] by ASR filtering device 250, and thereafter reads the values of variables n, m, j and i from the identified user profile as stored in database 253. The identification signal can include a data component or a characteristic indicating a frequency response characteristic of mobile phone 20 or wireless network 30 as would occur to those having ordinary skill in the art.

In response to variables n, m, j and i, ASR filter 252 establishes a filter $J_{t5}(z,i,j,m,n)[k]$ in accordance with the following equations [1], [2], [14] and [15]:

$$P_{t1} = C_t^m * W_t^j * F_t^i \quad [1]$$

$$P_{r1} = A_r^n * C_r^m * W_r^j * F_r^i \quad [2]$$

$$y[k] \cong P_{t1} * A_o^n * N_1[k] \quad [14]$$

$$J_{t5}(z, i, j, m, n)[k] = \frac{T_3[k] - y[k] - (P_{t1} * P_{r1} * R_1[k])}{P_{t1} * A_u^n * (T_3[k] - y[k])} \quad [15]$$

ASR filter 252 filters transmission signal T₃[k], noise discrimination signal y[k], and audio signal R₁[k] through filter $J_{t5}(z,i,j,m,n)[k]$ to provide speech signal U₂[k] as an approximation of speech signal U₁[k].

In embodiments of the present invention wherein wireless network 30 is omitted, ASR filter 252 establishes a filter $J_{t6}(z,i,m,n)[k]$ in accordance with the following equations [4], [5], [16] and [17]:

$$P_{t2} = C_t^m * F_t^i \quad [4]$$

$$P_{r2} = A_r^n * C_r^m * F_r^i \quad [5]$$

$$y[k] \cong P_{t2} * A_o^n * N_1[k] \quad [16]$$

$$J_{t6}(z, i, m, n)[k] = \frac{T_3[k] - y[k] - (P_{t2} * P_{r2} * R_1[k])}{P_{t2} * A_u^n * (T_3[k] - y[k])} \quad [17]$$

whereby ASR filter 252 filters transmission signal T₃[k], noise discrimination signal y[k], and audio signal R₁[k] through filter $J_{t6}(z,i,m,n)[k]$ to provide speech signal U₂[k] as an approximation of speech signal U₁[k].

In embodiments of the present invention wherein wireline network 40 is omitted, ASR filter 252 establishes a filter $J_{t7}(z,j,m,n)[k]$ in accordance with the following equations [7], [8], [18] and [19]:

$$P_{t3} = C_t^m * W_t^j \quad [7]$$

$$P_{r3} = A_r^n * C_r^m * W_r^j \quad [8]$$

$$y[k] \cong P_{t3} * A_o^n * N_1[k] \quad [18]$$

$$J_{t7}(z, j, m, n)[k] = \frac{T_3[k] - y[k] - (P_{t3} * P_{r3} * R_1[k])}{P_{t3} * A_u^n * (T_3[k] - y[k])} \quad [19]$$

whereby ASR filter 252 filters transmission signal T₃[k], noise discrimination signal y[k], and audio signal R₁[k] through filter $J_{t7}(z,j,m,n)[k]$ to provide speech signal U₂[k] as an approximation of speech signal U₁[k].

In embodiments of the present invention wherein wireless network 30 and wireline network 40 is omitted, ASR filter 252 establishes a filter $J_{t8}(z,m,n)[k]$ in accordance with the following equations [10], [11], [20] and [21]:

$$P_{t4} = C_t^m \quad [10]$$

$$P_{r4} = A_r^n * C_r^m \quad [11]$$

$$y[k] \cong P_{t4} * A_o^n * N_1[k] \quad [20]$$

$$J_{t8}(z, m, n)[k] = \frac{T_3[k] - y[k] - (P_{t4} * P_{r4} * R_1[k])}{P_{t4} * A_u^n * (T_3[k] - y[k])} \quad [21]$$

whereby ASR filter 252 filters transmission signal T₃[k], noise discrimination signal y[k], and audio signal R₁[k] through filter $J_{t8}(z,m,n)[k]$ to provide speech signal U₂[k] as an approximation of speech signal U₁[k].

ASR filtering device 150 (FIG. 3) and ASR filtering device 250 (FIG. 4) have been described herein as pre-ASR filtering devices in electrical communication with ASR platform 60 (FIG. 1). In alternative embodiments of the present invention, ASR filtering device 150 and ASR filtering device 250 may be incorporated into ASR platform 60.

ASR filtering device 150 (FIG. 3) and ASR filtering device 250 (FIG. 4) have also been described herein in the context of an employment within a telecommunication system having a transceiver situated within a vehicle. In alternative embodiments of the present invention, ASR filtering device 150 and ASR filtering device 250 may employed within various other systems used for audio communication purposes such as, for example, a video conferencing system, and the transceivers of such systems can be situated within the system as would occur to those having ordinary skill in the art.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. An automated speech recognition filtering device, comprising:
    a database operable to store a user profile corresponding to a transceiver, the user profile including first variable indicative of an identification of the transceiver;
    an automated speech recognition filter operable to determine a transceiver transmission model and a transceiver reception model in response to a reception of the first variable, the transceiver transmission model being representative of a first signal degradation on a first speech signal by the transceiver, the transceiver reception model being representative of a second signal degradation of the first speech signal by the transceiver; and a noise suppression module operable to provide a second speech signal in response to a reception of the first speech signal by said automated speech recognition filtering device, the second speech signal being a product of an attenuation of a noise component from the first speech signal,
    wherein said automated speech recognition filter is further operable to provide a third speech signal as a function of the transceiver transmission model and the second speech signal.

2. An automated speech recognition filtering device, comprising:
a database operable to store a user profile corresponding to a transceiver, the user profile including a first variable indicative of an identification of the transceiver;
an automated speech recognition filter operable to determine a transceiver transmission model and a transceiver reception model in response to a reception of the first variable, the transceiver transmission model being representative of a first signal degradation on a first speech signal by the transceiver, the transceiver reception model being representative of a second signal degradation of the first speech signal by the transceiver; and
a noise discrimination module operable to provide a noise discrimination signal in response to a reception of the first speech signal by said automated speech recognition filtering device,
    wherein said automated speech recognition filter is further operable to provide a second speech signal as a function of the transceiver transmission model, the transceiver reception model, and the noise discrimination signal.

3. An automated speech recognition filtering device, comprising:
a database operable to store a user profile corresponding to a transceiver, the user profile including a first variable indicative of an identification of the transceiver;
an automated speech recognition filter operable to determine a transceiver transmission model and a transceiver reception model in response to a reception of the first variable, the transceiver transmission model being representative of a first signal degradation on a first speech signal by the transceiver, the transceiver reception model being representative of a second signal degradation of the first speech signal by the transceiver; and
a noise suppression module operable to provide a second speech signal in response to a reception of the first speech signal by said automated speech recognition filtering device, the second speech signal being a product of an attenuation of a noise component from the first speech signal,
    wherein said automated speech recognition filter is operable to provide a third speech signal as a function of the transceiver transmission model, the transceiver reception model, and the second speech signal.

4. An automated speech recognition filtering device comprising:
a database operable to store a user profile corresponding to a transceiver, the user profile including a first variable indicative of an identification of the transceiver;
an automated speech recognition filter operable to determine a transceiver transmission model and a transceiver reception model in response to a reception of the first variable, the transceiver transmission model being representative of a first signal degradation on a first speech signal by the transceiver, the transceiver reception model being representative of a second signal degradation of the first speech signal by the transceiver;
wherein the user profile further includes a second variable indicative of an identification of wireless network within a transmission signal path between the transceiver and said automated speech recognition filtering device; and
wherein said automated speech recognition filter is further operable to determine a wireless transmission model in response to a reception of the second variable, the wireless transmission model being representative of a second signal degradation of the first speech signal along the transmission signal path by the wireless network.

5. The automated speech recognition filtering device of claim 4, further comprising:
a noise discrimination module operable to provide a noise discrimination signal in response to a reception of the first speech signal by the automated speech recognition filtering device,
    wherein said automated speech recognition filter is further operable to provide a second speech signal as a function of the transceiver transmission model, the wireless transmission model, and the noise discrimination signal.

6. The automated speech recognition filtering device of claim 4, further comprising:
a noise suppression module operable to provide a second speech signal in response to a reception of the speech signal by said automated speech recognition filtering device, the second speech signal being a product of an attenuation of a noise component from the first speech signal,
    wherein said automated speech recognition filter is further operable to provide a third speech signal as a function of the transceiver transmission model, the wireless transmission model, and the second speech signal.

7. An automated speech recognition filtering device, comprising:
a database operable to store a user profile corresponding to a transceiver, the user profile including a first variable indicative of an identification of the transceiver;
an automated speech recognition filter operable to determine a transceiver transmission model and a transceiver reception model in response to a reception of the first variable, the transceiver transmission model being representative of a first signal degradation on a first speech signal by the transceiver, the transceiver reception model being representative of a second signal degradation of the first speech signal by the transceiver,
wherein the user profile further includes a second variable indicative of an identification of wireless network within a reception signal path between the transceiver and said automated speech recognition filtering device, and
wherein said automated speech recognition filter is further operable to determine a wireless reception model in response to a reception of the second variable, the wireless reception model being representative of a second signal degradation of the first speech signal along the transmission signal path by the wireless network.

8. The automated speech recognition filtering device of claim 7, further comprising;

a noise discrimination module operable to provide a noise discrimination signal in response to a reception of the first speech signal by the said automated speech recognition filtering device,
  wherein said automated speech recognition filter is further operable to provide a second speech signal as a function of the transceiver transmission model, the wireless reception model, and the noise discrimination signal.

9. The automated speech recognition filtering device of claim 7, further comprising:
a noise suppression module operable to provide a second speech signal in response to a reception of the first speech signal by said automated speech recognition filtering device, the second speech signal being a product of an attenuation of a noise component from the first speech signal,
  wherein said automated speech recognition filter is further operable to provide a third speech signal as a function of the transceiver transmission model, the wireless reception model, and the second speech signal.

10. An automated speech recognition filtering device, comprising:
a database operable to store a user profile corresponding to a transceiver, the user profile including a first variable indicative of an identification of the transceiver;
an automated speech recognition filter operable to determine a transceiver transmission model and a transceiver reception model in response to a reception of the first variable, the transceiver transmission model being representative of a first signal degradation on a first speech signal by the transceiver, the transceiver reception model being representative of a second signal degradation of the first speech signal by the transceiver;
  wherein the user profile further includes a second variable indicative of an identification of wireline network within a transmission signal path between the transceiver and said automated speech recognition filtering device; and
  wherein said automated speech recognition filter is further operable to determine a wireline transmission model in response to a reception of the second variable, the wireline transmission model being representative of a second signal degradation of the first speech signal along the transmission signal path by the wireline network.

11. The automated speech recognition filtering device of claim 10, further comprising:
a noise discrimination module operable to provide a noise discrimination signal in response to a reception of the first speech signal by said automated speech recognition filtering device,
  wherein said automated speech recognition filter is further operable to provide a second speech signal as a function of the transceiver transmission model, the wireline transmission model, and the noise discrimination signal.

12. The automated speech recognition filtering device of claim 10, further comprising:
a noise suppression module operable to provide a second speech signal in response to a reception of the first speech signal by said automated speech recognition filtering device, the second speech signal being a product of an attenuation of a noise component from the first speech signal,
  wherein said automated speech recognition filter is further operable to provide a third speech signal as a function of the transceiver transmission model, the wireline reception model, and the second speech signal.

13. An automated speech recognition filtering device, comprising:
a database operable to store a user profile corresponding to a transceiver, the user profile including a first variable indicative of an identification of the transceiver;
an automated speech recognition filter operable to determine a transceiver transmission model and a transceiver reception model in response to a reception of the first variable, the transceiver transmission model being representative of a first signal degradation on a first speech signal by the transceiver, the transceiver reception model being representative of a second signal degradation of the first speech signal by the transceiver,
  wherein the user profile further includes a second variable indicative of an identification of wireline network within a reception signal path between the transceiver and said automated speech recognition filtering device; and
  wherein said automated speech recognition filter is further operable to determine a wireline reception model in response to a reception of the second variable, the wireline reception model being representative of a second signal degradation of the first speech signal along the transmission signal path by the wireline network.

14. The automated speech recognition filtering device of claim 13, further comprising:
a noise discrimination module operable to provide a noise discrimination signal in response to a reception of the first speech signal by said automated speech recognition filtering device,
  wherein said automated speech recognition filter is further operable to provide a second speech signal as a function of the transceiver transmission model, the wireline reception model, and the noise discrimination signal.

15. The automated speech recognition filtering device of claim 13, further comprising:
a noise suppression module operable to provide a second speech signal in response to a reception of the first speech signal by said automated speech recognition filtering device, the second speech signal being a product of an attenuation of a noise component from the first speech signal,
  wherein said automated speech recognition filter is further operable to provide a third speech signal as a function of the transceiver transmission model, the wireline transmission model, and the second speech signal.

16. An automated speech recognition filtering device, comprising:
a database operable to store a user profile corresponding to a transceiver, the user profile including a first variable indicative of an identification of the transceiver;
an automated speech recognition filter operable to determine a transceiver transmission model and a transceiver reception model in response to a reception of the first variable, the transceiver transmission model being representative of a first signal degradation on a first speech signal by the transceiver, the transceiver reception model being representative of a second signal degradation of the first speech signal by the transceiver;
  wherein the user profile further includes a second variable indicative of an identification of a vehicle having said transceiver therein; and wherein said automated speech recognition filter is further operable to determine one or more acoustical models in response to a reception of the second variable, the one or more acoustical models being representative of a second signal degradation of the first speech signal by the vehicle.

17. The automated speech recognition filtering device of claim 16, further comprising:
a noise discrimination module operable to provide a noise discrimination signal in response to a reception of the first speech signal by said automated speech recognition filtering device,
wherein said automated speech recognition filter is further operable to provide a second speech signal as a function of the one or more acoustical models, the transceiver transmission model, and the noise discrimination signal.

18. The automated speech recognition filtering device of claim 16, further comprising:
a noise suppression module operable to provide a second speech signal in response to a reception of the first speech signal by said automated speech recognition filtering device, the second speech signal being a product of an attenuation of a noise component from the first speech signal,
wherein said automated speech recognition filter is further operable to provide a third speech signal as a function of the one or more acoustical models, the transceiver transmission model, and the second speech signal.

19. An automated speech recognition filtering device, comprising:
a database operable to store a user profile corresponding to a transceiver, the user profile including a first variable indicative of an identification of the transceiver;
an automated speech recognition filter operable to determine a transceiver transmission model and a transceiver reception model in response to a reception of the first variable, the transceiver transmission model being representative of a first signal degradation on a first speech signal by the transceiver, the transceiver reception model being representative of a second signal degradation of the first speech signal by the transceiver;
a noise suppression module operable to provide a second speech signal in response to a reception of the first speech signal by said automated speech recognition filtering device, the second speech signal being a product of an attenuation of a noise component from the first speech signal;
wherein said automated speech recognition filter is further operable to receive an audio signal from an automated speech recognition platform; and
wherein said automated speech recognition filter is operable to provide a third speech signal as a function of the transceiver transmission model, the second speech signal, and the audio signal.

20. A method of processing voice commands spoken into a first transceiver and transmitted over a first wireless network, said method comprising:
storing a plurality of processing functions, wherein each processing function optimizes voice recognition characteristics for a discrete set selected from at least one of a plurality of transceivers, a plurality of wireless networks and a plurality of wireless network components,
wherein the first transceiver is one of the plurality of transceivers and wherein the first wireless network is one of the plurality of wireless networks,
receiving a signal having an identifying data component,
wherein the identifying data component indicates at least one of (a) first frequency response characteristics of the first transceiver, and (b) second frequency response characteristics of the wireless network, and
responsive to the identifying component, selecting from the plurality of processing functions a selected processing function,
wherein the selected processing function optimizes processing of the spoken voice commands for at least one of the first transceiver and the first wireless network.

21. A method of processing voice commands spoken into a first transceiver and transmitted over a first wireless network, said method comprising:
storing a plurality of processing functions, wherein each processing function optimizes voice recognition characteristics for a discrete set selected from at least one of a plurality of transceivers, a plurality of wireless networks and a plurality of wireless network components,
wherein the first transceiver is one of the plurality of transceivers and wherein the first wireless network is one of the plurality of wireless networks;
receiving a signal having an identifying characteristic,
wherein the identifying characteristic indicates at least one of (a) first frequency response characteristics of the first transceiver, and (b) second frequency response characteristics of the first wireless network or components thereof; and
responsive to the identifying characteristic, selecting from the plurality of processing functions a selected processing function,
wherein the selected processing function optimizes processing of the spoken voice commands for at least one of the first transceiver and the first wireless network.

22. An automated speech recognition filtering, comprising:
a database operable to store a user profile corresponding to a transceiver, the user profile including a first variable indicative of an identification of the transceiver; and
an automated speech recognition filter operable to determine a transceiver transmission model in response to a reception of the first variable, the transceiver transmission model being representative of a first signal degradation on a first speech signal by the transceiver; and
a noise suppression module operable to provide a second speech signal in response to a reception of the first speech signal by said automated speech recognition filtering device, the second speech signal being a product of an attenuation of a noise component from the first speech signal,
wherein said automated speech recognition filter is further operable to provide a third speech signal as a function of the transceiver transmission model and the second speech signal.

* * * * *